(12) United States Patent
Bozak et al.

(10) Patent No.: US 7,653,902 B2
(45) Date of Patent: Jan. 26, 2010

(54) DETERMINING SOFTWARE DEPLOYMENT PARAMETERS

(75) Inventors: Erol Bozak, Pforzheim (DE);
Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 809 days.

(21) Appl. No.: 11/010,872

(22) Filed: Dec. 13, 2004

(65) Prior Publication Data

US 2006/0130056 A1 Jun. 15, 2006

(51) Int. Cl.
*G06F 9/445* (2006.01)
*G06F 9/44* (2006.01)

(52) U.S. Cl. .................... 717/177; 717/103; 717/121; 717/175

(58) Field of Classification Search ......... 717/174–178, 717/100, 120–121, 168–169
See application file for complete search history.

(56) References Cited

U.S. PATENT DOCUMENTS

| | | | | |
|---|---|---|---|---|
| 5,761,380 A | * | 6/1998 | Lewis et al. ................ | 706/47 |
| 6,892,382 B1 | * | 5/2005 | Hapner et al. .............. | 717/174 |
| 7,093,247 B2 | * | 8/2006 | Ashworth et al. .......... | 717/174 |
| 7,107,576 B2 | * | 9/2006 | Takahashi et al. .......... | 717/120 |
| 7,284,039 B2 | * | 10/2007 | Berkland et al. ........... | 709/219 |
| 7,409,676 B2 | * | 8/2008 | Agarwal et al. ............ | 717/120 |
| 2003/0018963 A1 | * | 1/2003 | Ashworth et al. .......... | 717/175 |
| 2003/0163807 A1 | * | 8/2003 | Drake et al. ............... | 717/174 |
| 2003/0212990 A1 | * | 11/2003 | Brodkorb et al. ........... | 717/174 |
| 2004/0025157 A1 | * | 2/2004 | Blight et al. ............... | 717/174 |
| 2004/0172612 A1 | * | 9/2004 | Kasravi et al. ............. | 717/101 |
| 2005/0108703 A1 | * | 5/2005 | Hellier ...................... | 717/174 |
| 2006/0200818 A1 | * | 9/2006 | Oprea et al. ............... | 717/174 |

OTHER PUBLICATIONS

Auer, et al., "Visualizing Software Project Analogies to Support Cost Estimation", ICEIS Apr. 2004—Artificial Intelligence and Decision Support Systems.*
Hall et al., "A Cooperative Approach to Support Software Deployment Using the Software Dock"; May 22, 1999, ICSE, pp. 174-183.*

* cited by examiner

*Primary Examiner*—Wei Zhen
*Assistant Examiner*—Ryan D Coyer
(74) *Attorney, Agent, or Firm*—Finnegan, Henderson, Farabow, Garrett & Dunner LLP

(57) ABSTRACT

Methods and apparatus, including computer program products, for matching software requirements against target system landscape descriptions and for applying rating metrics to intermediate results during the matchmaking process. Data are received as inputs describing the requirements and dependencies of a particular software application and the resources available in the target system that may be able to meet these requirements. These data are searched for combinations of system resources that will satisfy the requirements of the application as well as optimization metrics and other requirements supplied by the user. Once a match is found, it is given a rating and ranked against any other matches.

31 Claims, 2 Drawing Sheets

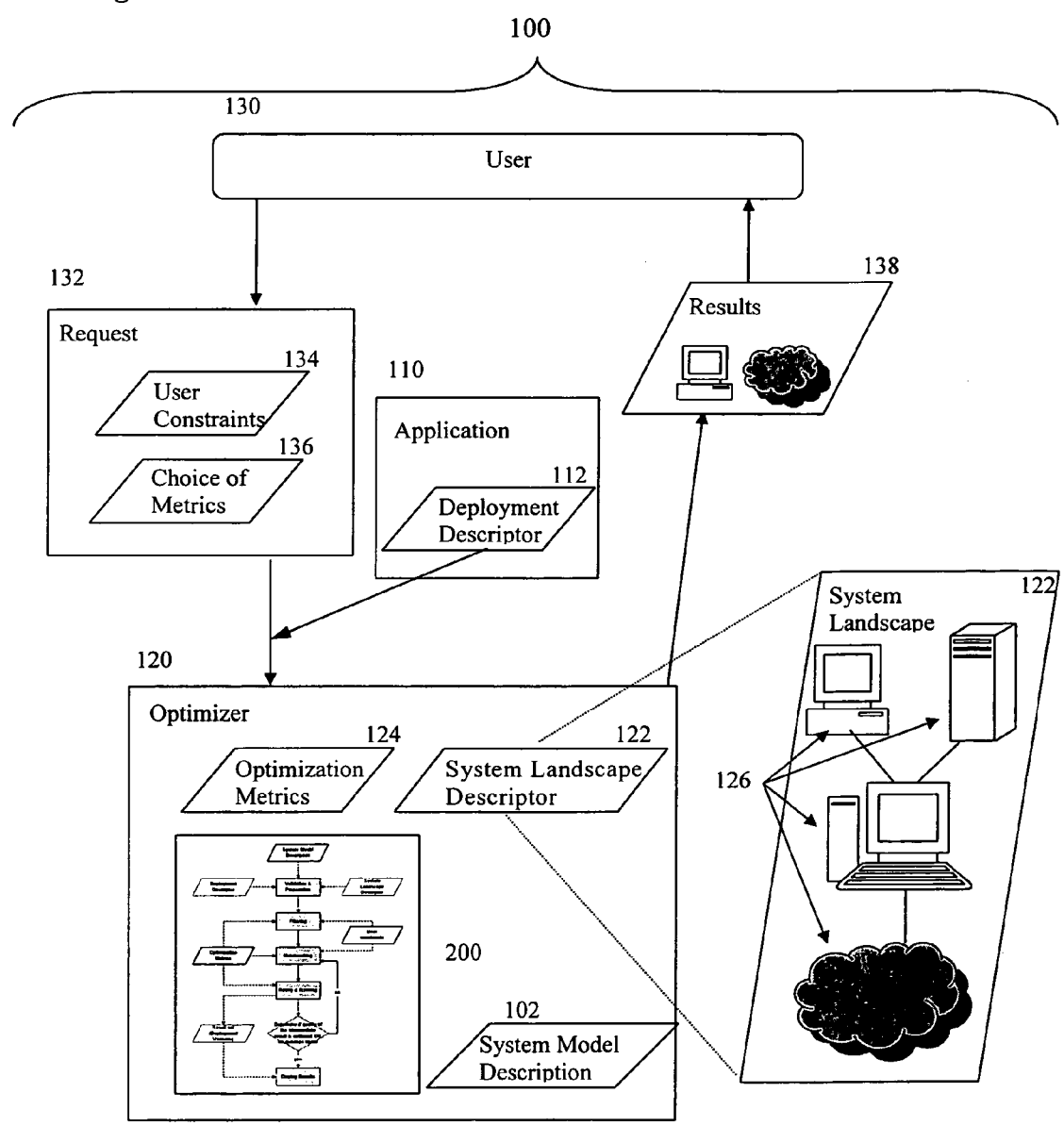

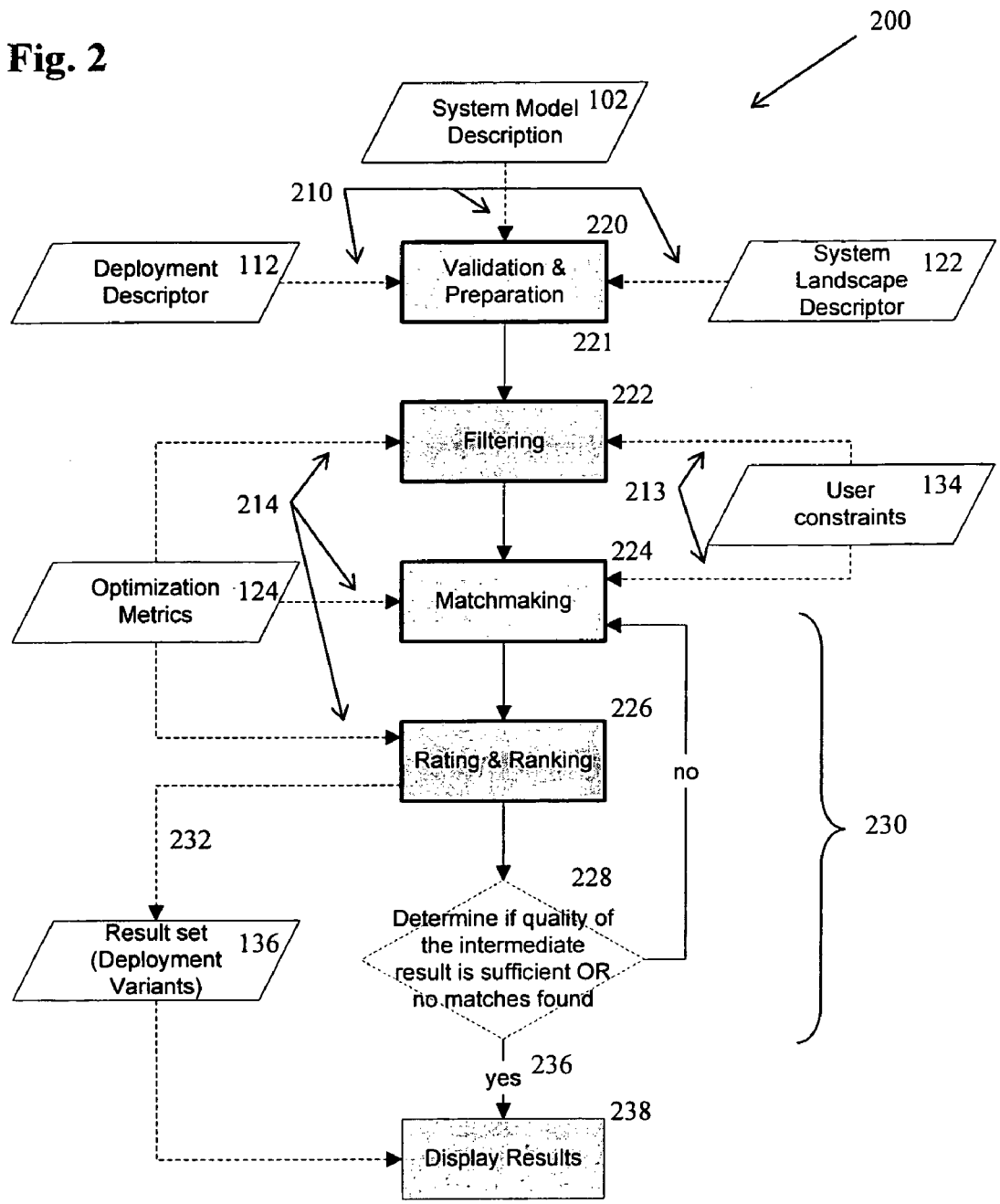

DETERMINING SOFTWARE DEPLOYMENT PARAMETERS

BACKGROUND

This invention relates to data processing by digital computer, and more particularly to determining software deployment parameters.

An interconnected collection of computing resources may be referred to as a system landscape. Such a system landscape includes the computers, networks, and other connected devices available within a given scope. The system landscapes of large enterprises are generally complex and heterogeneous. They include various types of computers (such as mainframes, servers or workstations), different storage systems, and multiple network topologies, with various levels of interconnection. Further, the operators of such a system may have a variety of policies and rules governing the use of these resources, designed to optimize such factors as availability, quality of service, and cost.

Modern software applications exhibit a similar degree of complexity, i.e., they have complex interdependencies, different sizing variations, and specific system requirements. This complexity is compounded, generating significant challenges, when such software is to be installed into a target system landscape. Since many dependencies have to be taken into account, and multiple combinations of resources may satisfy the software's requirements to varying degrees of efficiency, it is difficult to manually find an appropriate assembly of all the required resources needed to run the software in a target landscape that ensures optimal operation while complying with the policies of the operators of the system.

SUMMARY

The description describes methods and apparatus, including computer program products, for matching software requirements against target system landscape descriptions and for applying rating metrics to intermediate results during the matchmaking process.

In general, a process of matching requirements to resources involves receiving as inputs a description of the requirements or dependencies of a particular software application to be deployed on a computer system, and a description of the resources available in the system that may be able to meet these requirements, referred to as the system landscape, together with any further conditions governing such a deployment. The process verifies that these inputs refer to resources in a common manner and may filter out of its representation of the system landscape resources that are not relevant to the requirements of the software application being deployed. The process then searches through the system landscape description for combinations of resources that will satisfy the requirements of the application, as well as any optimization metrics and other requirements that may be supplied. Such other requirements may come from the user, for example specifying that he must have physical access to the resources used, or from the owner of the computer network, for example specifying a preference that certain types of applications be run on certain systems. Optimization metrics define relationships between system landscape resources and program requirements and are used to assure that an optimal combination of resources is determined. Once a match is found, it is given a rating based on the optimization metrics and ranked against any other matches. In one embodiment, the first match with a rating above a threshold value is returned. In other embodiments, the process repeats until another condition is met, such as finding a given number of matches above the threshold, or fining all possible matches.

To implement this process a system is described in which a user makes a request that a combination of resources be provided that will meet the requirements or dependencies of a particular software application. An optimizer, having access to a description of the system landscape and any metrics to be used in evaluating potential matches of requirements to resources, uses the process to find and evaluate such matches, and then outputs to the user a list of which resources may be used to deploy the software application. Such output may include simply the best match, or alternatively may include a number of matches above some threshold measure of quality, or may include all the matches that the process was able to discover. In another variation, the metrics used in evaluating matches are supplied by the application, as part of the requirements and dependencies that it communicates to the optimizer. The optimizer may, as part of the process, evaluate the inputs to assure that they use a common method of describing requirements and resources. It may also simplify the contents of the inputs to assure more efficient operation of the matching process.

One advantage of the described process is that it address challenges presented by the generally complex and heterogeneous system landscape of a modern computing environment and similarly complex requirements of modern software. By automating the process of finding an appropriate assembly of all the resources available to run a particular software application in a target landscape, this process makes it easier to deploy software in such a complex computing environment. It can be configured to find the best combination of resources available, or to provide a number of configurations, allowing the user from to choose from among a manageable number of configurations rather than having to manually evaluate each possible arrangement of resources.

Other features and advantages of the invention are apparent from the following description, and from the claims.

DESCRIPTION OF THE DRAWINGS

FIG. 1 is a flow diagram.
FIG. 2 is a flow diagram.
Like reference numbers and designations in the various drawings indicate like elements.

DETAILED DESCRIPTION

As shown in FIG. 1, a process 200 can be implemented in a computing system 100. Application 110 provides a deployment descriptor 112. Deployment optimizer 120 has access to a system model description 102 and a system landscape descriptor 122. The system model description 102 defines the grammar and semantics of the deployment descriptor 112 and the landscape descriptor 122. The deployment descriptor 112 specifies the requirements and the dependencies of the application 110, such as operating system constraints, hardware dependencies like central processing unit (CPU) speed or storage capacity, and other software components that are required by the software. System landscape descriptor 122 describes components 126 of the system landscape including available operating systems, hardware capabilities, and software components, and represents a snapshot of an organization's computing and networking environment, a data structure representing that environment according to the system model description 102. Optimizer 120 also has access to optimization metrics 124, which represent organization specific optimization policies expressed through functions, for example, if a policy were to run memory-intensive programs on one particular set of machines and computation-intensive tasks on a different set, an optimization metric may assign a value to a resource allotment that complied with this policy that is higher than the value assigned to a resource allotment that did not comply. System model description 102, system landscape descriptor 122, and optimization metrics 124 may be in deployment optimizer 120's internal memory or may be available to deployment optimizer 120 from an outside source as needed.

User 130 sends a request 132 to deployment optimizer 120. The request 132 inquires which of components 126 may be used to deploy application 110 in the system landscape represented by system landscape descriptor 122. Request 132 contains user constraints 134 and an indication 136 of which optimization metrics 124 should be used. The request is accompanied by deployment descriptor 112 from application 110. When this request is received, deployment optimizer 120 uses process 200 to generate a result set 138 which is returned to user 130.

As shown in FIG. 2, a process 200 receives (210) as inputs a system model description 102, a deployment descriptor 112, and a target system landscape descriptor 122. These inputs 102, 112, and 122 are validated (220) to verify that the deployment descriptor 112 and the landscape descriptor 122 both refer to a common system model and use a common grammar and semantics as defined in the system model description 102. Preparation (221) of the input data may include conversion to an internal representation, which allows faster and more efficient processing, and normalization, in which the internal form of the data is enhanced with implicit information to allow easier processing. For example, this may include replacing diverse descriptions of equivalent hardware resources with a common identifier.

After the inputs have been validated (220) and prepared (221), they may be filtered (222) to constrain the search space for the rest of process 200. Constraints 134 are received (213) from the user 130. Optimization metrics 124 are received (214) from internal memory or an external source. These are used together with deployment descriptor 112 to remove irrelevant components 126 of the landscape descriptor 122 which need not be processed. For example, the user may decide that computing resources having a CPU speed lower than 500 MHz should not be taken into account, in which case the filtering (222) will remove such computing resources from the system landscape descriptor 122. Likewise, the deployment descriptor 112 or optimization metrics 124 could define such constraints. Optimization metrics 124 may be used at several stages of process 200 to influence the way in which results are generated and evaluated. The user may specify which optimization metrics 124 to use in a particular instance of the process by including a choice of metrics 136 as part of their request 132 that the process be used. The filtering (222) produces a reduced landscape description and ensures that only relevant parts of the system landscape description 122 are searched for a match.

Matchmaking (224) includes searching for combinations of resources 126 from the landscape descriptor 122 that match the requirements of the software to be deployed as defined in the deployment descriptor 112. The combinations found by this process are referred to as matches. Matchmaking (224) may be a search technique combined with a pattern matching algorithm. The pattern matching can be implemented in various ways such as constraint satisfaction techniques or graph pattern matching algorithms. Constraints restrict which matches are generated by, for example, specifying that certain combinations of resources 126 not be assembled. These constraints may be input (213, 214) via user constraints 134 or optimization metrics 124, or read from the deployment descriptor 112.

After a match has been generated, it is rated and ranked (226) using the appropriate optimization metrics 124. The functions in the optimization metrics 124 are used to determine a level of quality for the match. The level of quality of the match is compared (228) to a required level of quality defined in the deployment descriptor 112, and if the level of quality of the match is at least equal to the required level of quality, the match is considered sufficient and recorded (232) in the result set 138. If the match is not sufficient and more matches are possible, the process enters a loop 230, finding (224) and rating (226) additional matches, the loop being terminated (236) when a sufficient match is found or no more matches are possible. Once the loop 230 has been terminated (236), the result set 138 to be returned is displayed (238) to the user 130. Variations may include continuing execution until all possible matches, or some intermediate number of matches, are found, and then returning the highest ranked of those matches. Further variations may include returning more than one match, such as the five highest-ranked matches, or all matches above a particular level of quality. Care must be taken to avoid defining a termination condition that may never be reached.

The functions represented by the optimization metrics 124 may be combined in various ways, including composition of the functions through a formula. Optimization metrics may also be combined through prioritization, where matches which have the same ranking under the highest priority metric are further compared based on a metric with the next-lower priority.

In another variation, normalization of the input data may be done at the end of the filtering, which may additionally accelerate the optimization.

In the basic form, the deployment descriptor 112 does not allow structure variances, i.e. the software to be deployed has a static structure and does not allow alternative combinations of parts of it. However, there are software systems that require landscape specific adaptation. For instance, before installing a cluster-based application server the user has to decide how many servers need to be installed. The number of servers, however, is dependent on the load and the power of the computing resources used as servers. One solution for this is to search for solutions for all possible structure variances of the software in the target landscape. This, however, would multiply the number of loops 230 with the number of possible variations of the structure the software can accommodate. Heuristics like genetic algorithms can be used to constrain the search space and significantly cut down processing time.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. The above examples are for illustration only and not to limit the alternatives in any way. The steps of the invention can be performed in a different order and still achieve desirable results.

What is claimed is:

1. A method of searching for components in a computing environment for deployment of software, the method being executed by a deployment unit and comprising:
   receiving, from software to be deployed, a deployment descriptor which describes a requirement of the software;
   storing a system landscape descriptor which represents a snapshot of the computing environment by describing the components of the computing environment;
   providing a system model description defining grammar and semantics to be used for validation of the deployment descriptor and the system landscape descriptor;
   providing an optimization metric including optimization policies, the optimization metric being separate from the deployment descriptor and the optimization policies being implemented by using corresponding functions;
   receiving, by the deployment unit, a request to determine which of the components is suitable for deployment of the software, the request including a constraint and an indication for selection of one of the optimization policies, the constraint being separate from the deployment descriptor and the optimization metric;
   verifying, by using the system model description and a processor in the deployment unit, that the deployment descriptor and the system landscape descriptor refer to a common system model and use common grammar and semantics;
   filtering, from the stored system landscape descriptor, description of at least one of the components not to be evaluated during the requested determination, when verification is successful, the filtration being based on the constraint, the deployment descriptor and one of the optimization policies selected using the indication, and being performed by the processor before running and deployment of the software;
   performing, by using the processor, the requested determination by generating a list of suitable components whose description in the filtered system landscape descriptor matches the requirement described in the deployment descriptor; and
   ranking the matches according to one of the optimization policies selected using the indication, wherein the matches are ranked by determining levels identifying a quality of match corresponding to the suitable components in the list by using one of the functions and by comparing the levels with a required level defined in the deployment descriptor.

2. The method of claim 1, wherein the deployment descriptor further describes dependencies of the software to be deployed.

3. The method of claim 1 further comprising repeating searching and ranking until a result of sufficient quality is found or no additional matches are possible.

4. The method of claim 3 further comprising returning the result.

5. The method of claim 1 further comprising repeating searching and ranking until a plurality of matches have been found.

6. The method of claim 5 further comprising returning at least one of the plurality of matches, a subset of the plurality of matches, and a best-ranked match of the plurality.

7. The method of claim 1, further comprising normalizing input data representing the deployment descriptor and the system landscape descriptor or the filtered system landscape descriptor before or after the filtration, the normalized input data being used during the determination.

8. The method of claim 1, wherein the computing environment is an organization specific computing environment such that the system landscape descriptor describes components of the specific organization, the optimization policies are specific to the organization, and the request including the constraint is provided by a user in the organization.

9. The method of claim 1, further comprising:
generating a result set based on the ranked matches, the result set including a first selection of the suitable components whose corresponding levels are greater than or equal to the required level; and
displaying the result set.

10. The method of claim 9, wherein a second selection of the suitable components whose levels are less than the required level are excluded from the result set.

11. A system for searching for components for deployment of software, the system comprising:
a memory device comprising instructions corresponding to software to be deployed;
a processor executing the instructions to receive a deployment descriptor from the software, the deployment descriptor describing a requirement of the software;
means for storing a system landscape descriptor which represents a snapshot of the computing environment by describing the components of the computing environment;
means for providing a system model description defining grammar and semantics to be used for validation of the deployment descriptor and the system landscape descriptor;
means for providing an optimization metric including optimization policies, the optimization metric being separate from the deployment descriptor and the optimization policies being implemented by using corresponding functions; and
an optimizer configured to:
receive a request to determine which of the components is suitable for deployment of the software, the request including a constraint and an indication for selection of one of the optimization policies, the constraint being separate from the deployment descriptor and the optimization metric;
verify, by using the system model description, that the deployment descriptor and the system landscape descriptor refer to a common system model and use common grammar and semantics;
filter, from the stored system landscape descriptor, description of at least one of the components not to be evaluated during the requested determination, when verification is successful, the filtration being based on the constraint, the deployment descriptor and one of the optimization policies selected using the indication, and being performed before running and deployment of the software;
perform the requested determination by generating a list of suitable components whose description in the filtered system landscape descriptor matches the requirement described in the deployment descriptor; and
rank the matches according to one of the optimization policies selected using the indication, wherein the matches are ranked by determining levels identifying a quality of match corresponding to the suitable components in the list by using one of the functions and by comparing the levels with a required level defined in the deployment descriptor.

12. The system of claim 11, wherein the deployment descriptor further describes dependencies of the software to be deployed.

13. The system of claim 11, further comprising a means for finding a result of sufficient quality by repeatedly searching and ranking until a result of sufficient quality is found or no additional matches are possible.

14. The system of claim 13 further comprising a means for returning the result.

15. The system of claim 11 further comprising a means for repeatedly searching and ranking until a plurality of matches have been found.

16. The system of claim 15 further comprising a means for returning at least one of the plurality of matches, a subset of the plurality of matches, and a best-ranked match of the plurality.

17. The system of claim 11 further comprising means for normalizing input data representing the deployment descriptor and the system landscape descriptor or the filtered system landscape descriptor before or after the filtration, the normalized input data being used during the determination.

18. The system of claim 11, wherein the computing environment is an organization specific computing environment such that the system landscape descriptor describes components of the specific organization, the optimization policies are specific to the organization, and the request including the constraint is provided by a user in the organization.

19. The system of claim 11, further comprising:
generating a result set based on the ranked matches, the result set including a first selection of the suitable components whose corresponding levels are greater than or equal to the required level; and
displaying the result set.

20. The system of claim 19, wherein a second selection of the suitable components whose levels are less than the required level are excluded from the result set.

21. A machine-readable storage medium comprising instructions which, when executed on a processor, cause the processor to perform a method of searching for components in a computing environment for deployment of software, the method comprising:
receiving, from software to be deployed, a deployment descriptor which describes a requirement of the software;
storing a system landscape descriptor which represents a snapshot of the computing environment by describing the components of the computing environment;
providing a system model description defining grammar and semantics to be used for validation of the deployment descriptor and the system landscape descriptor;
providing an optimization metric including optimization policies, the optimization metric being separate from the deployment descriptor and the optimization policies being implemented by using corresponding functions;
receiving, by an optimizer, a request to determine which of the components is suitable for deployment of the software, the request including a constraint and an indication for selection of one of the optimization policies, the constraint being separate from the deployment descriptor and the optimization metric;
verifying, by using the system model description, that the deployment descriptor and the system landscape descriptor refer to a common system model and use common grammar and semantics;

filtering, from the stored system landscape descriptor, description of at least one of the components not to be evaluated during the requested determination, when verification is successful, the filtration being based on the constraint, the deployment descriptor and one of the optimization policies selected using the indication and being performed before running and deployment of the software;

performing the requested determination by generating a list of suitable components whose description in the filtered system landscape descriptor matches the requirement described in the deployment descriptor; and ranking the matches according to one of the optimization policies selected using the indication, wherein the matches are ranked by determining levels identifying a quality of match corresponding to the suitable components in the list by using one of the functions and by comparing the levels with a required level defined in the deployment descriptor.

22. The machine-readable storage medium of claim 21, wherein the deployment descriptor data further describes dependencies of the software to be deployed.

23. The machine-readable storage medium of claim 21, wherein the method further comprises repeatedly searching and ranking until a result of sufficient quality is found or no additional matches are possible.

24. The machine-readable storage medium of claim 23 wherein the method further comprises returning the result.

25. The machine-readable storage medium of claim 21, wherein the method further comprises searching and ranking until a plurality of matches have been found.

26. The machine-readable storage medium of claim 25 wherein the method further comprises returning at least one of the plurality of matches, a subset of the plurality of matches, and a best-ranked match of the plurality.

27. The machine-readable storage medium of claim 21, wherein the method further comprised normalizing input data representing the deployment descriptor and the system landscape descriptor or the filtered system landscape descriptor before or after the filtration, the normalized input data being used during the determination.

28. The machine-readable storage medium of claim 21, wherein the computing environment is an organization specific computing environment such that the system landscape descriptor describes components of the specific organization, the optimization policies are specific to the organization, and the request including the constraint is provided by a user in the organization.

29. The machine-readable storage medium of claim 21, wherein the method further comprises:

generating a result set based on the ranked matches, the result set including a first selection of the suitable components whose corresponding levels are greater than or equal to the required level; and displaying the result set.

30. The machine-readable storage medium of claim 29, wherein a second selection of the suitable components whose levels are less than the required level are excluded from the result set.

31. A machine-readable storage medium comprising instructions which, when executed on a processor, cause the processor to perform a method of searching for a collection of components in a computing environment for deployment of software, the method comprising:

receiving, from software to be deployed, a deployment descriptor which describes a requirement of the software;

storing a system landscape descriptor which represents a snapshot of the computing environment by describing the components of the computing environment;

providing a system model description defining grammar and semantics to be used for validation of the deployment descriptor and the system landscape descriptor;

providing an optimization metric including optimization policies, the optimization metric being separate from the deployment descriptor and the optimization policies being implemented by using corresponding functions;

receiving, by an optimizer, a request to determine which combination of components included in the collection is suitable for deployment of the software, the request including a constraint and an indication for selection of one of the optimization policies, the constraint being separate from the deployment descriptor and the optimization metric;

verifying, by using the system model description, that the deployment descriptor and the system landscape descriptor refer to a common system model and use common grammar and semantics;

filtering, from the stored system landscape descriptor, description of at least one of the components not to be evaluated during the requested determination, when verification is successful, the filtration being based on the constraint, the deployment descriptor and one of the optimization policies selected using the indication and being performed before running and deployment of the software;

performing the requested determination by generating a list of suitable combinations of components whose description in the filtered system landscape descriptor matches the requirement described in the deployment descriptor;

ranking the matches according to one of the optimization policies selected using the indication, wherein the matches are ranked by determining levels identifying a quality of match corresponding to the suitable combinations in the list by using one of the functions and by comparing the levels with a required level defined in the deployment descriptor;

generating a result set based on the ranked matches, the result set including a first selection of a collection of components included in a combination whose corresponding level is greater than or equal to the required level;

displaying the result set for selection by a user; and deploying the software based on a selection received from the user.

* * * * *

UNITED STATES PATENT AND TRADEMARK OFFICE
CERTIFICATE OF CORRECTION

PATENT NO. : 7,653,902 B2
APPLICATION NO. : 11/010872
DATED : January 26, 2010
INVENTOR(S) : Bozak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twenty-third Day of November, 2010

David J. Kappos
*Director of the United States Patent and Trademark Office*